US011334342B1

(12) United States Patent
Gerhart et al.

(10) Patent No.: US 11,334,342 B1
(45) Date of Patent: May 17, 2022

(54) UPDATING FIRMWARE OF UNSUPPORTED DEVICES

(71) Applicant: Dell Products L.P., Round Rock, TX (US)

(72) Inventors: Donald Gerhart, Leander, TX (US); Santosh Gore, Bangalore (IN); Raveendra Babu Madala, Bangalore (IN); Alaa Yousif, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/140,899

(22) Filed: Jan. 4, 2021

(51) Int. Cl.
| | |
|---|---|
| *G06F 8/65* | (2018.01) |
| *G06F 11/14* | (2006.01) |
| *G06F 8/61* | (2018.01) |
| *G06F 9/4401* | (2018.01) |

(52) U.S. Cl.
CPC ............. *G06F 8/65* (2013.01); *G06F 8/61* (2013.01); *G06F 9/4408* (2013.01); *G06F 11/1433* (2013.01)

(58) Field of Classification Search
CPC . G06F 8/61; G06F 8/65; G06F 9/4408; G06F 11/1417; G06F 11/1433
See application file for complete search history.

(56) References Cited

U.S. PATENT DOCUMENTS

| | | | |
|---|---|---|---|
| 6,944,757 B2* | 9/2005 | Wilks | G06F 9/4406 713/1 |
| 7,146,612 B2* | 12/2006 | Sedlack | G06F 8/63 717/178 |
| 2016/0306617 A1* | 10/2016 | Riedisser | G06F 8/65 |

* cited by examiner

*Primary Examiner* — Marina Lee
(74) *Attorney, Agent, or Firm* — Jackson Walker L.L.P.

(57) ABSTRACT

An information handling system may include an unsupported information handling resource that has not been qualified by a manufacturer of the information handling system for use with the information handling system. The system may execute a system update procedure configured to: download a vendor update package for the unsupported information handling resource; determine that the vendor update package requires an operating system different from a currently installed operating system of the information handling system; create a bootable medium comprising the operating system and the vendor update package; trigger a first reboot of the information handling system into the operating system of the bootable medium, wherein the bootable medium is configured to install the vendor update package; and trigger a second reboot of the information handling system into the currently installed operating system of the information handling system.

20 Claims, 3 Drawing Sheets

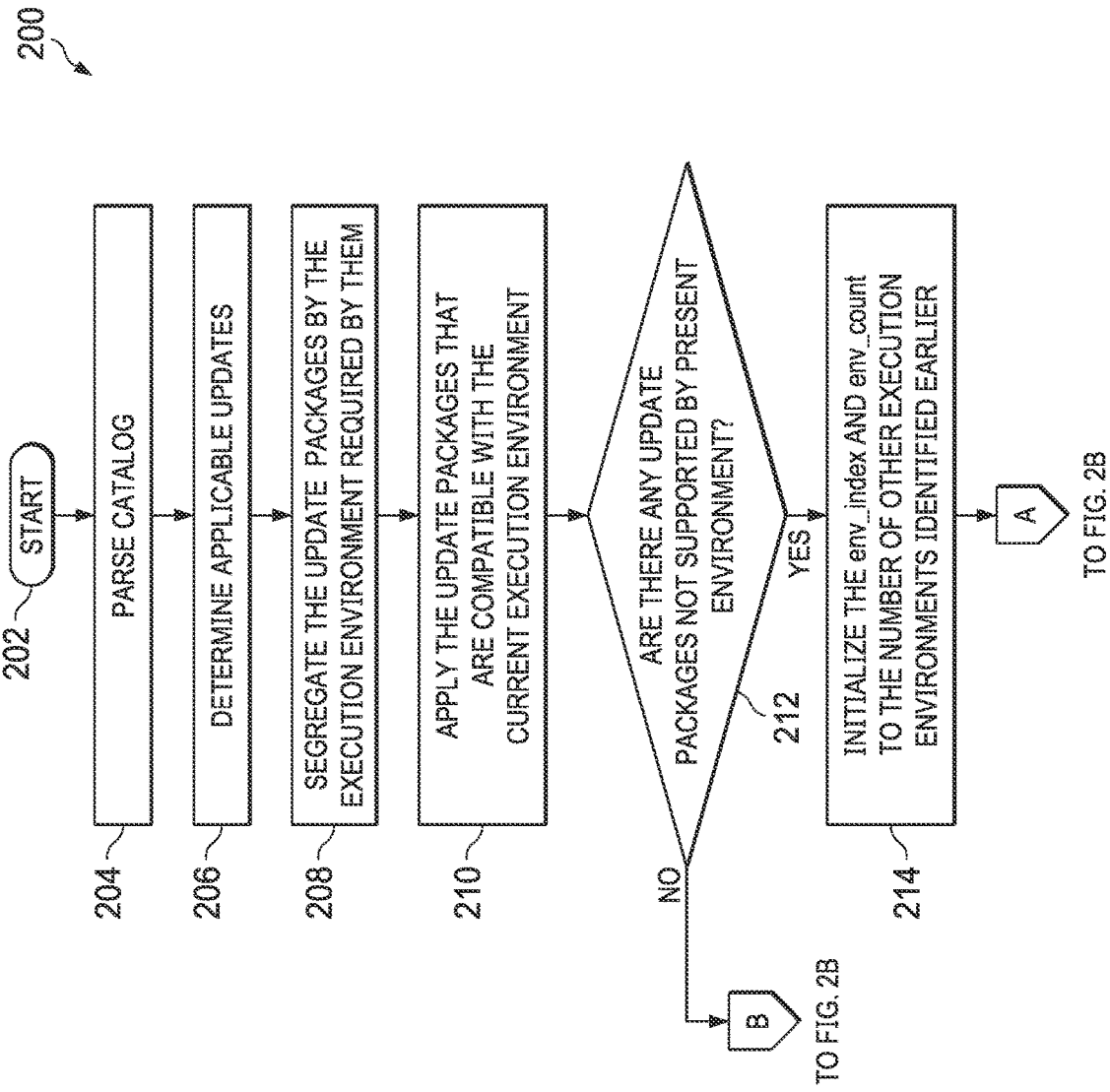

UPDATING FIRMWARE OF UNSUPPORTED DEVICES

TECHNICAL FIELD

The present disclosure relates in general to information handling systems, and more particularly to firmware updates of information handling resources in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A motherboard or backplane of an information handling system may provide interfaces for connecting information handling resources. For example, industry-standard interfaces such as Peripheral Component Interconnect/Peripheral Component Interconnect Express (PCI/PCIe) may be used in some instances. A system provider may often qualify a particular set of devices for use with a given information handling system. These are called "supported" devices. The management and upkeep of supported devices is usually part of the qualification or support of the system.

Firmware updates for supported devices may be provided as a standardized update package. For example, Dell® may provide such updates in a Dell Update Package (DUP) format.

However, customized information handling systems may also include "unsupported" devices that have not been qualified by the system provider. For example, customers might add off-the-shelf components (which may use a standard connection interface) to their systems. Challenges may exist for updating the firmware of such unsupported or off-the-shelf components.

For example, such an update may not be available in the standardized format mentioned above, thereby hindering the ability for users to apply the update using the existing tools/interfaces. Further, out-of-band update support might not be available. Still further, a component update tool/method provided by a vendor might not be available on all supported operating systems that may be installed on the information handling system.

Accordingly, embodiments of this disclosure may provide a way of enabling the update of unsupported devices in a seamless manner via a system update procedure. As one example of such a system update procedure, this disclosure may refer to the Dell EMC System Update (DSU) procedure, but one of ordinary skill in the art with the benefit of this disclosure will understand that other types of system update procedures are also specifically contemplated. In general, system update procedures are typically configured to automatically determine when updates are available, download the updates, and apply the updates to all supported information handling resources. In some embodiments, system update procedures may be managed in an out-of-band fashion by a management controller, as discussed below.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with firmware updates of information handling resources in information handling systems may be reduced or eliminated.

In accordance with embodiments of the present disclosure, an information handling system may include an unsupported information handling resource that has not been qualified by a manufacturer of the information handling system for use with the information handling system. The system may execute a system update procedure configured to: download a vendor update package for the unsupported information handling resource; determine that the vendor update package requires an operating system different from a currently installed operating system of the information handling system; create a bootable medium comprising the operating system and the vendor update package; trigger a first reboot of the information handling system into the operating system of the bootable medium, wherein the bootable medium is configured to install the vendor update package; and trigger a second reboot of the information handling system into the currently installed operating system of the information handling system.

In accordance with these and other embodiments of the present disclosure, a method may include executing a system update procedure of an information handling system comprising an unsupported information handling resource that has not been qualified by a manufacturer of the information handling system for use with the information handling system, wherein the system update procedure: downloads a vendor update package for the unsupported information handling resource; determines that the vendor update package requires an operating system different from a currently installed operating system of the information handling system; creates a bootable medium comprising the operating system and the vendor update package; triggers a first reboot of the information handling system into the operating system of the bootable medium, wherein the bootable medium is configured to install the vendor update package; and triggers a second reboot of the information handling system into the currently installed operating system of the information handling system.

In accordance with these and other embodiments of the present disclosure, an article of manufacture may include a non-transitory, computer-readable medium having computer-executable instructions thereon that are executable by a processor of an information handling system that includes an unsupported information handling resource that has not been qualified by a manufacturer of the information handling system for use with the information handling system, the instructions being executable for: downloading a vendor update package for the unsupported information handling resource; determining that the vendor update package requires an operating system different from a currently installed operating system of the information handling system; creating a bootable medium comprising the operating system and the vendor update package; triggering a first reboot of the information handling system into the operating system of the bootable medium, wherein the bootable medium is configured to install the vendor update package; and triggering a second reboot of the information handling system into the currently installed operating system of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
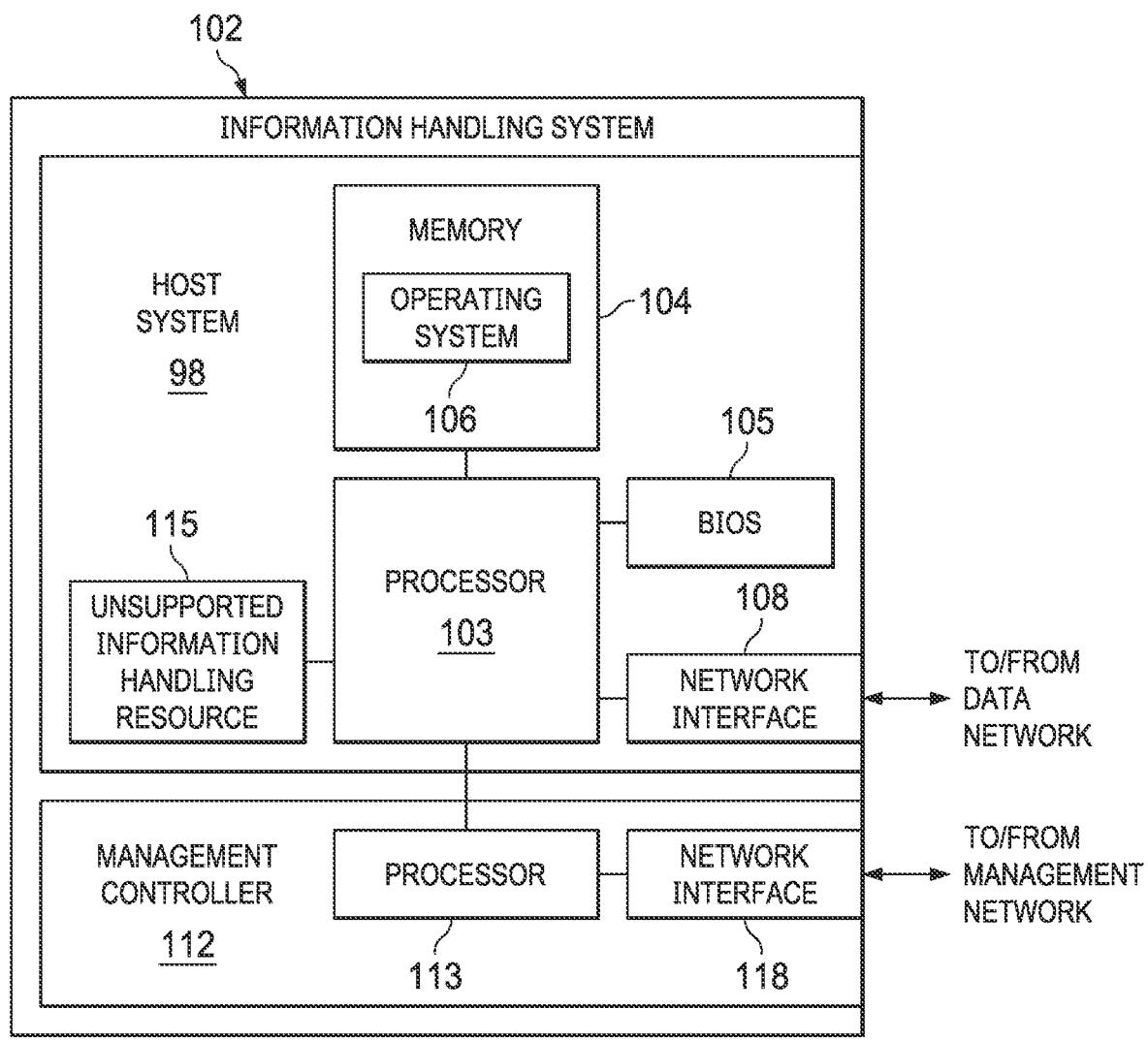
FIG. 1 illustrates a block diagram of an example information handling system, in accordance with embodiments of the present disclosure.

Preferred embodiments and their advantages are best understood by reference to FIGS. 1 through 2, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, information handing system 102 may further include an unsupported information handling resource 115 communicatively coupled to processor 103. Unsupported information handling resource 115 may include therein a firmware (e.g., program code and/or data stored on an integrated storage device such as a flash storage device).

In some embodiments, a vendor of unsupported information handling resource 115 may provide a tool/script for updating the firmware of unsupported information handling resource 115. This may be referred to herein as a Vendor Update Package (VUP). Such a VUP may not be designed to integrate with a full system update procedure that may be provided by the vendor of information handling system 102. The full system update procedure may include an operating system utility for performing various update operations for the various components of information handling system 102, and it may in some embodiments include out-of-band application of updates via management controller 112.

The system update procedure may include update metadata information provided in an update catalog. According to some embodiments of this disclosure, the VUP information may also be included with the individual updates provided in the system update procedure by adhering to a novel update schema.

Some VUP packages may require operating systems that are not supported by the standard platform of information handling system 102. In such situations, embodiments of this disclosure may include references to artifacts that facilitate the creation of a bootable computer-readable medium (e.g., an ISO file) with the required operating system. While performing the update via the system update procedure, based on the execution environment, the system update procedure may create a boot image dynamically as discussed below with reference to FIG. 2. Further, in some embodiments, a plurality of boot images may be nested or chained if more than one OS image is needed. Once the boot image(s) are created with the VUP(s), the system update procedure may then use them for applying the updates using VUPs.

Figure 2B:
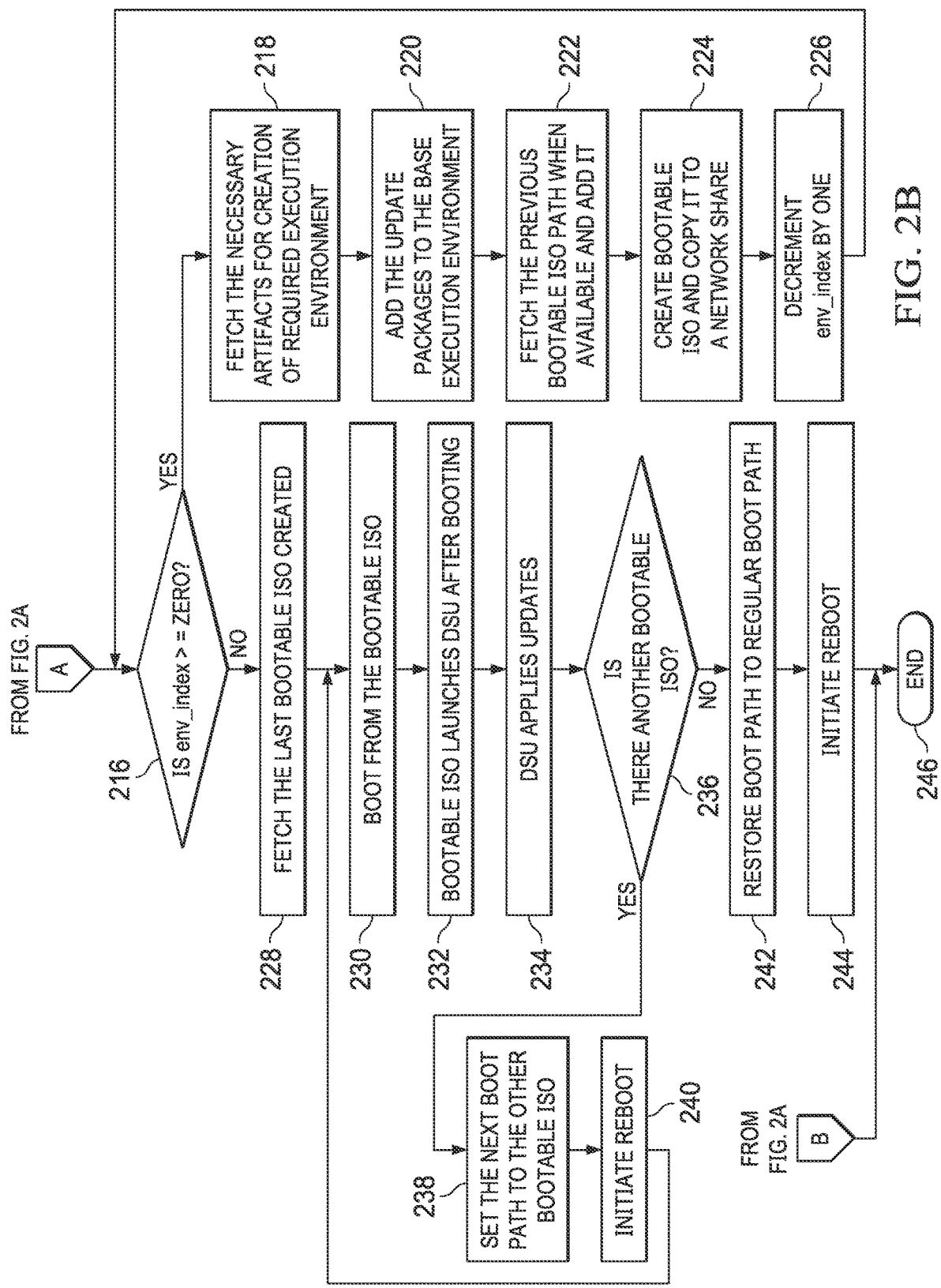
FIG. 2 (which includes FIGS. 2A and 2B) illustrates an example method, in accordance with embodiments of the present disclosure.

Turning now to FIG. 2 (which includes FIGS. 2A and 2B), a flow chart is shown of an example method 200 for updating unsupported devices is shown, in accordance with some embodiments of this disclosure. Method 200 may be carried out by a system update procedure and may begin at step 202.

At step 204-206, the system update procedure may parse an update catalog to determines the applicable updates. At step 208, the system update procedure may segregate the update packages based on the execution environment (e.g., the required operating system).

At step 210, the system update procedure may apply any update packages that are compatible with the current execution environment. If there are no additional update packages unsupported by the current execution environment at step 212, then the method may end at step 250.

If, on the other hand, there are update packages unsupported by the current execution environment, then at step 214 the system update procedure may get the number of execution environments required for applying the remaining updates and initialize one or more variables with that information. For example, env_count may indicate the total number of execution environments needed, and env_index may indicate the execution environment that is currently being handled. In some embodiments, env_index may be initialized to the same value as env_count.

While env_index is greater than zero, the method may loop at steps 216-226. In this loop, the system update procedure may fetch the artifacts required by the execution environment for the creation of bootable ISO at step 218. At step 220, the system update procedure may add the update packages to the obtained artifacts.

At step 222, the system update procedure may fetch the previously created bootable ISO path. If the previously created bootable ISO path is present, then the system update procedure may add the script/data for restoring the reboot step to the previously created bootable ISO.

At step 224, the bootable ISO may be created and stored to a network share. The env_index variable may then be decremented at step 226.

Once env_index reaches zero, all the required bootable images have been created. At step 228, the system update procedure may fetch the last bootable ISO image created. The method may then loop over all of the created ISO images at steps 230-240.

In particular, the ISO may be booted at step 230. At step 232, the bootable ISO may launch the system update procedure (which is referred to as DSU in this example). The system update procedure may then apply any included updates at step 234. If there are additional ISO images at step 236, then the next boot path may be set to another bootable ISO at step 238. If the script/data for setting the bootable path is present, then the script may be executed, or the data for setting the boot path to referred boot image may be used. If the script/data for setting the bootable path is absent, then the boot path may be set to the regular boot path. A reboot may be triggered at step 240.

Once all of the bootable ISOs have been booted and their updates applied, the method may proceed to step 242. The boot path may be restored to the regular boot path, a reboot may be triggered at step 244, and the method may end at step 246.

With the above workflow, all the updates are applied with a single invocation of the system update procedure by the user. The system update procedure may dynamically create the required number of bootable images, boot from them to apply the specified updates, and restarts the system.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Accordingly, embodiments of this disclosure may provide many advantages. For example, embodiments may provide an efficient method for applying update for unsupported/ unqualified devices. Further, embodiments may provide a seamless update experience for unsupported devices on par with supported devices. An automated method for daisy chained bootable ISO images may be used to apply updates requiring different operating environments in some embodiments. The dynamic creation of bootable ISO(s) with the OS needed by the VUP may also be provided. Finally, dynamic creation of a root folder with the OS needed by the VUP may also be provided.

Heretofore, there has been no seamless method for performing updates on unsupported devices. Embodiments of this disclosure may not require a user to be aware of where updates are hosted for the unsupported devices, monitor the availability of updates, manually download the updates, inventory the firmware version on the unsupported devices, and apply the updates separately for those unsupported devices.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one hardware processor; and
   an unsupported information handling resource that has not been qualified by a manufacturer of the information handling system for use with the information handling system;
   wherein the information handling system is configured to execute a system update procedure configured to:
   download a vendor update package for the unsupported information handling resource;

determine that the vendor update package requires an operating system different from a currently installed operating system of the information handling system;

create a bootable medium comprising the operating system and the vendor update package;

trigger a first reboot of the information handling system into the operating system of the bootable medium, wherein the bootable medium is configured to install the vendor update package; and trigger a second reboot of the information handling system into the currently installed operating system of the information handling system.

2. The information handling system of claim 1, wherein the information handling system comprises a plurality of unsupported information handling resources having respective vendor update packages requiring a respective plurality of operating systems; and wherein the system update procedure is configured to create a plurality of bootable media corresponding to the plurality of operating systems.

3. The information handling system of claim 2, wherein the system update procedure is further configured to trigger reboots of the information handling system into the plurality of operating systems in a determined sequence, wherein the plurality of bootable media are configured to install the respective vendor update packages.

4. The information handling system of claim 1, wherein the system update procedure is executed by a management controller of the information handling system.

5. The information handling system of claim 1, wherein the vendor update package is configured to update a firmware of the unsupported information handling resource.

6. The information handling system of claim 1, wherein the system update procedure is configured to carry out the downloading, the determining, the creating, the triggering the first reboot, and the triggering the second reboot in response to a single command from a user of the information handling system.

7. The information handling system of claim 1, wherein the information handling system further comprises a supported information handling resource that has been qualified by the manufacturer of the information handling system for use with the information handling system; and wherein the system update procedure is further configured to perform an update of the supported information handling resource.

8. A method comprising:

executing a system update procedure of an information handling system comprising an unsupported information handling resource that has not been qualified by a manufacturer of the information handling system for use with the information handling system, wherein the system update procedure:

downloads a vendor update package for the unsupported information handling resource;

determines that the vendor update package requires an operating system different from a currently installed operating system of the information handling system;

creates a bootable medium comprising the operating system and the vendor update package;

triggers a first reboot of the information handling system into the operating system of the bootable medium, wherein the bootable medium is configured to install the vendor update package; and triggers a second reboot of the information handling system into the currently installed operating system of the information handling system.

9. The method of claim 8, wherein the information handling system comprises a plurality of unsupported information handling resources having respective vendor update packages requiring a respective plurality of operating systems; and wherein the system update procedure is configured to create a plurality of bootable media corresponding to the plurality of operating systems.

10. The method of claim 9, wherein the system update procedure is further configured to trigger reboots of the information handling system into the plurality of operating systems in a determined sequence, wherein the plurality of bootable media are configured to install the respective vendor update packages.

11. The method of claim 8, wherein the system update procedure is executed by a management controller of the information handling system.

12. The method of claim 8, wherein the vendor update package is configured to update a firmware of the unsupported information handling resource.

13. The method of claim 8, wherein the system update procedure carries out the downloading, the determining, the creating, the triggering the first reboot, and the triggering the second reboot in response to a single command from a user of the information handling system.

14. The method of claim 8, wherein the information handling system further comprises a supported information handling resource that has been qualified by the manufacturer of the information handling system for use with the information handling system; and wherein the system update procedure performs an update of the supported information handling resource.

15. An article of manufacture comprising a non-transitory, computer-readable medium having computer-executable instructions thereon that are executable by a processor of an information handling system that includes an unsupported information handling resource that has not been qualified by a manufacturer of the information handling system for use with the information handling system, the instructions being executable for:

downloading a vendor update package for the unsupported information handling resource;

determining that the vendor update package requires an operating system different from a currently installed operating system of the information handling system;

creating a bootable medium comprising the operating system and the vendor update package;

triggering a first reboot of the information handling system into the operating system of the bootable medium, wherein the bootable medium is configured to install the vendor update package; and triggering a second reboot of the information handling system into the currently installed operating system of the information handling system.

16. The article of claim 15, wherein the information handling system comprises a plurality of unsupported information handling resources having respective vendor update packages requiring a respective plurality of operating systems; and wherein the system update procedure is configured to create a plurality of bootable media corresponding to the plurality of operating systems.

17. The article of claim 16, wherein the system update procedure is further configured to trigger reboots of the information handling system into the plurality of operating systems in a determined sequence, wherein the plurality of bootable media are configured to install the respective vendor update packages.

18. The article of claim 15, wherein the instructions are executable by a management controller of the information handling system.

19. The article of claim 15, wherein the vendor update package is configured to update a firmware of the unsupported information handling resource.

20. The article of claim 15, wherein the system update procedure is configured to carry out the downloading, the determining, the creating, the triggering the first reboot, and the triggering the second reboot in response to a single command from a user of the information handling system.

* * * * *